United States Patent

[11] 3,596,146

[72] Inventor James A. McDonald
Downers Grove, Ill.

[21] Appl. No. 840,915
[22] Filed July 11, 1969
[45] Patented July 27, 1971
[73] Assignee Motorola, Inc.
Franklin Park, Ill.

[54] HIGH EFFICIENCY MULTIVIBRATOR

9 Claims, 5 Drawing Figs.

[52] U.S. Cl. .......... 317/146, 317/148.5, 331/113 R, 331/144
[51] Int. Cl. .......... H01h 47/22, H03k 3/281
[50] Field of Search .......... 331/144; 307/273; 321/45; 317/146

[56] References Cited

UNITED STATES PATENTS

| | | | |
|---|---|---|---|
| 2,948,820 | 8/1960 | Bothwell .......... | 307/273 |
| 3,233,161 | 2/1966 | Sikorra .......... | 321/45 X |
| 3,284,083 | 11/1966 | Levin et al. .......... | 331/113 |

*Primary Examiner*—J. D. Miller
*Assistant Examiner*—Harry E. Moose, Jr.
*Attorney*—Mueller & Aichele

ABSTRACT: A high efficiency multivibrator circuit uses four transistors arranged in the form of a bridge with two of the transistors connected in series with the load and selectively biased to saturation to provide a current to the load. A second pair of transistors is also connected in series with the load to provide current of opposite polarity thereto, and are biased to saturation while the first pair if biased to nonconduction. The alternate pairs of transistors are alternately biased to saturation by multivibrator action to alternately connect the power supply across the load with opposite polarities.

Inventor
JAMES A. McDONALD
BY
Mueller, Aichele & Rauner
ATTYS.

Inventor
JAMES A. McDONALD
BY
Mueller, Aichele & Rauner
ATTYS.

HIGH EFFICIENCY MULTIVIBRATOR

BACKGROUND OF THE INVENTION

Multivibrator circuits are used extensively in electronic equipment as switches or signal generators. However, prior art multivibrators have had a relatively low efficiency and have consumed a relatively large amount of power so that a limited amount of power is available to the load. The output of a conventional multivibrator may, for example, alternate between a reference voltage and the supply voltage level so that the maximum potential across the load is the supply potential. Further, when a transistor is conducting to reduce the voltage applied to the load to a low value, current flows through a series resistor which consumes a large amount of power not useful to the load. The switch which turns the multivibrator on and off is normally in series with the power supply, so that switch must carry the entire current switched by the multivibrator. Furthermore, where the multivibrators are to be used intermittently as a switch for actuating a relay or similar device, large expensive components are required to actuate the device.

SUMMARY OF THE INVENTION

It is, therefore, an object of this invention to provide an improved high efficiency multivibrator circuit.

Another object of this invention is to provide a multivibrator circuit which applies the entire supply voltage across the load alternating the polarity thereof.

A further object of this invention is to provide a power supplying multivibrator circuit which can be turned on and off by switching a circuit which does not carry the load current.

Still another object of this invention is to provide an improved multivibrator circuit which does not have a large resistance in series with the load so that the current consumed by the multivibrator circuit is low.

In practicing this invention a multivibrator circuit is provided including four multivibrator transistors connected in the form of a bridge circuit with the power supply connected across two terminals of the bridge and the load connected across the other two terminals of the bridge. A control circuit is coupled between the four multivibrator transistors to bias alternate pairs of the transistors between saturation and nonconduction. Some forms of the multivibrator are free running and others can be switched from one state to another.

The invention is illustrated in the drawings of which:

DETAILED DESCRIPTION OF THE INVENTION

Figure 1:
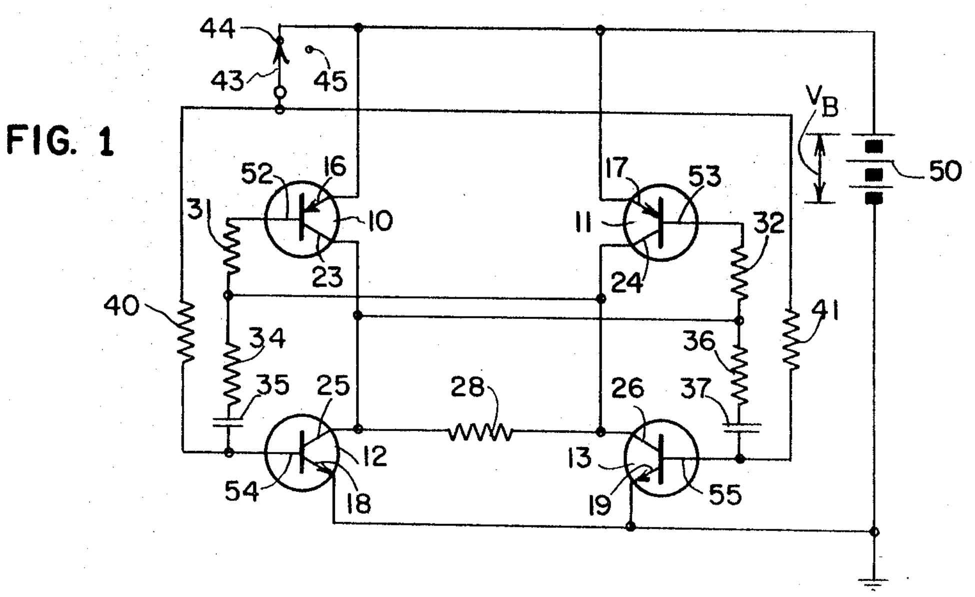
FIG. 1 is a schematic of the multivibrator circuit of this invention.

Referring to FIG. 1 there is shown the schematic of one form of the multivibrator of this invention. Four transistors 10, 11, 12 and 13 are connected together to form a bridge circuit with each of the four transistors comprising one arm of the bridge. Emitters 16 and 17 are connected together and to one terminal of power supply 50 and emitters 18 and 19 are connected together and to the other terminal of battery 50. Collectors 23 and 25 are connected together and to one terminal of load 28 and collectors 24 and 26 are connected together and to the other terminal of load 28.

In operation the multivibrator alternates between a first state in which transistors 10 and 13 are saturated and transistors 11 and 12 are nonconductive, and a second state in which transistors 11 and 12 are saturated and transistors 10 and 13 are nonconductive. In the first state current flows from power supply 50 through emitter 16 and collector 23 of transistor 10 through load 28 to collector 26 and emitter 19 of transistor 13 back to the power supply. In the second state current flows from power supply 50 through the emitter 17 of transistor 11 through load 28, collector 25 and emitter 18 of transistor 12 back to the battery 50. Thus it can be seen that battery 50 is alternately connected across load 28 with reverse polarity according to the state of the multivibrator.

In operation, assume the multivibrator is switched from state two to state one, then transistor 10 and transistor 13 are saturated and transistors 11 and 12 are cutoff. In this state the voltage on the base of transistor 12 is equal to $-(V_B - V_{be(sat)})$ where $V_{be(sat)}$ is the base-to-emitter voltage of the transistors when they are saturated. In this example assuming silicon transistors $V_{be(sat)}$ would be approximately 0.6 volts. Collectors 24 and 26 of transistors 11 and 13 are at a potential of 0 volts plus $V_{ce(sat)}$ where $V_{ce(sat)}$ is the collector-emitter saturation potential of a transistor when the transistor is biased to saturation. This voltage is of the order of 0.1 volts. In this condition capacitor 35 charges through resistor 40 until transistor 12 begins to turn on. As transistor 12 starts to conduct, the voltage on collectors 23 and 25 of transistors 10 and 12 starts to reduce, that is the load resistance for transistor 10 is reduced. The reduction of the collector voltage of transistors 10 and 12 is coupled by resistor 36 and capacitor 37 to base 55 of transistor 13 and acts to cutoff transistor 13. As the conduction of transistor 13 is reduced the voltage on collector 26 of transistor 13 starts to increase. The increased collector voltage of transistor 13 is coupled to the base 54 of transistor 12 through resistor 34 and capacitor 35 which further biases transistor 12 to conduction. This action is regenerative and thus the circuit changes from state 1 to state 2 where transistors 11 and 12 are saturated and transistors 10 and 13 are cutoff. Since the circuit is symmetrical the operation of the circuit is in state 2 and its change from state 2 to state 1 is the same as that described for change of state 1 to state 2.

With switch contact 43 in position 45, voltage is not supplied to capacitor 35 through resistor 40 or through resistor 41 to capacitor 37, so that the transistor multivibrator circuit enters a state with all of the transistor being nonconducting. In this state the multivibrators are turned off and no power is consumed. It should also be noted that the load current does not pass through switch contact 43 and a small transistor could easily be substituted for the switch contact 43.

Figure 2:
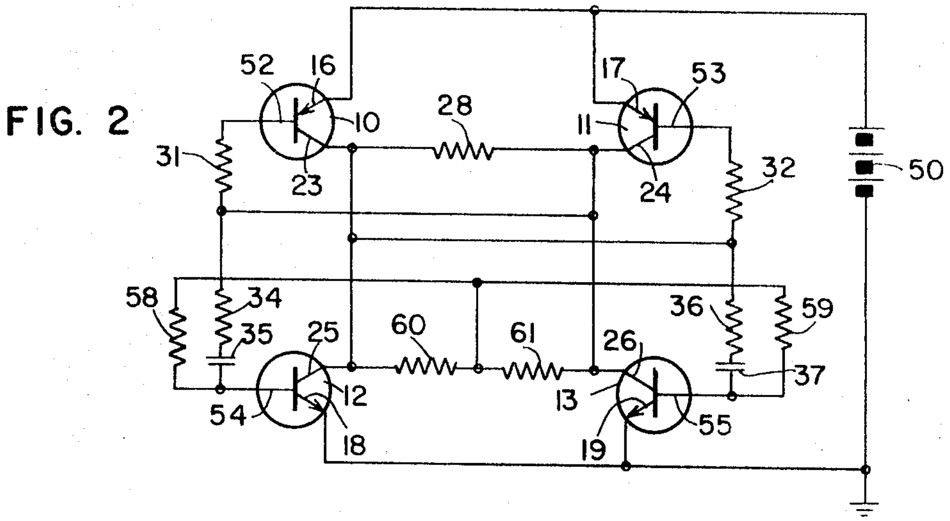
FIG. 2 is a schematic diagram of a "sure start" version of the multivibrator of FIG. 1.

In FIG. 2 there is shown a schematic of a "sure starting" circuit of the high efficiency multivibrator of FIG. 1. In this circuit resistors 60 and 61 which are equal in value are connected in parallel with load 28. Base 54 of transistor 12 is connected to the junction of resistors 60 and 61 through resistor 58 and base 55 of transistor 13 is connected to the junction of resistor 61 through resistor 59.

A problem which occurs with free-running multivibrators is that they are subject to locking up in an undesired mode of operation if the supply voltage is applied very slowly. If the circuit enters an undesired state, in this circuit, transistors 10, 11, 12 and 13 all in a Class A mode, a voltage will be fed back to the base 54 of transistor 12 through resistor 58 and to base 55 of transistor 13 through resistor 59. This feedback will cause the circuit to tend to oscillate until it reaches either state 1 or state 2. As the circuit reaches state 2 or state 1 it will continue to function as a multivibrator without locking up. If load 28 is a center tapped load, a connection could be made directly to the center tap of the load and resistors 60 and 61 would not be necessary.

Figure 3:
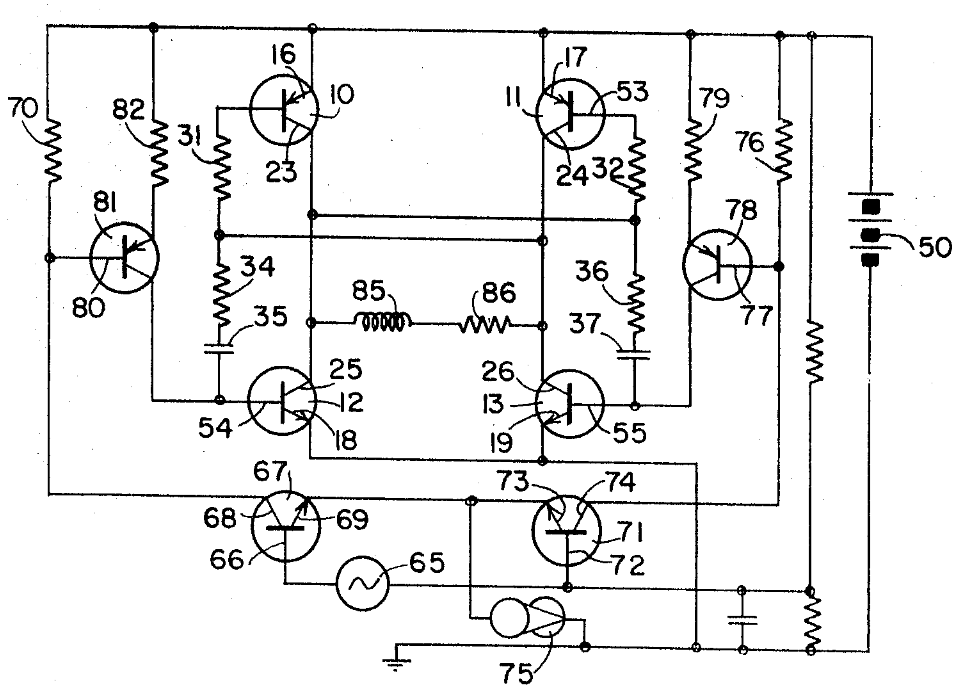
FIG. 3 is a schematic of a version of the multivibrator of this invention used as a Class D amplifier.

In FIG. 3 there is shown a schematic of a Class D amplifier utilizing the free-running high efficiency multivibrator of FIG. 1. A class D amplifier is one in which a rectangular high frequency waveform is applied to a load in such a way that the duty cycle can be varied. The load for this circuit should be high impedance at high frequency and low impedance at low frequency. Thus the high frequency rectangular wave delivers no power but the low frequency pulse width modulation of the high frequency square wave does deliver energy to the load. As such the efficiency of the Class D amplifier can approach 100 percent.

In FIG. 3 the free-running high efficiency multivibrator of this invention provides the switching circuitry for the Class D amplifier. The load consisting of choke 85 in series with resistor 86, is coupled between the collectors 23, 24, 25 and 26. An input signal generator 65 delivers the desired signal to base 66 of transistor 67 and base 72 of transistor 71. The AC current limiter 75, load resistor 70 connected to collector 68 and load resistor 76 connected to collector 74 together with transistors 67 and 71 form a differential amplifier. Collector 68 is connected to base 80 of transistor 81 and collector 74 is connected to base 77 of transistor 78.

Transistor 81 and resistor 82 form a current source and transistor 78 together with resistor 79 also form a current source. The current flow through transistors 78 and 81 is linearly related to the input voltage applied to base 66 of transistor 76 and base 72 of transistor 71. The current source consisting of transistor 81 and resistor 82 takes the place of resistor 40 of FIG. 1 and the current source consisting of transistor 78 and resistor 79 takes the place of resistor 41 of FIG. 1. By using a current source in place of resistors 40 and 41 of FIG. 1, the charging of capacitors 35 and 37 is linearly related to the input voltage from generator 65, and therefore, the duty cycle of the high efficiency multivibrator is linearly related to the input voltage.

In an example of a Class D amplifier of the type shown in FIG. 3, the frequency of the multivibrator was of the order of 100 Kc. while the input signal was of the order of 100 cycles. Choke 85 presents a high impedance to the high frequency (100 Kc.) switching of the high efficiency multivibrator and a low impedance to the 100 cycle change in duty cycle of the switching so that the 100 cycle component is delivered to the load resistor 86 with a minimum of loss. It is theoretically possible in a circuit of this type for the efficiency of the amplifier to approach 100 percent.

Figure 4:
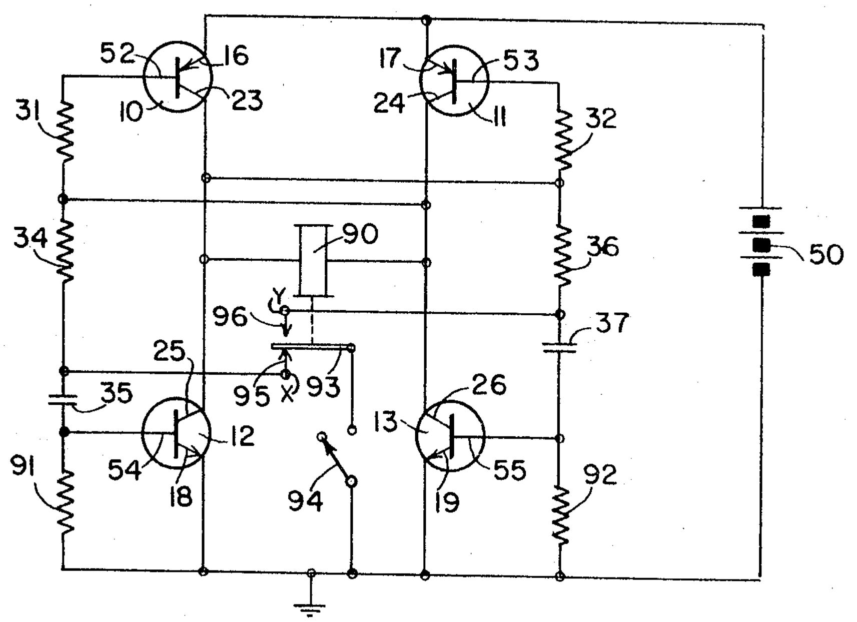
FIG. 4 is a schematic of the multivibrator circuit of this invention used as a relay control switch.

Referring to FIG. 4, there is shown the high efficiency multivibrator circuit used as a magnetic latching relay driver. The magnetic latching relay requires a pulse of energy to trigger it in one direction and an opposite polarity pulse to trigger it in the other direction. There is no requirement for a steady state current. Magnetic latching relays are used in equipment where energy conservation is important, thus a requirement for a magnetic latching relay driver circuit is that it draws no standby current. Therefore, the high efficiency multivibrator circuit is especially well adapted for use as a relay driver. In its normal mode of operation the multivibrator operates in a manner which provides the proper polarity pulses necessary to drive the magnetic latching relay. Further when not triggered, the transistors are biased to nonconduction and the circuit draws no standby current.

The relay coil 90 is connected between collectors 23, 24, 25 and 26 of transistors 10, 11, 12 and 13 as the load. The resistors 40 and 41 of FIG. 1 are replaced by a relay contact on the magnetic latching relay and a switch 94.

With switch 94 opened no current flows in the circuit thus the voltage across capacitor 35 and 37 is equal to to the supply voltage from battery 50. In order to change the position of the relay contacts switch 94 is closed. With switch 94 closed the potential on contact 95 drops to ground potential and therefore the potential on base 54 of transistor 12 drops to minus the battery 50 potential. Since capacitor 35 and base 54 of transistor 12 are connected to ground through resistor 91, capacitor 35 will charge through resistor 91 until the potential across capacitor 35 is zero. For correct operation of the circuit switch 94 must remain closed for a sufficient time to permit capacitor 35 to discharge.

When capacitor 35 is discharged, switch 94 is opened. The circuit will then attempt to charge capacitor 35 to a voltage equal to the battery potential. During this charging period transistors 11 and 12 will be saturated and transistors 10 and 13 remain in a cutoff state. While in this state the voltage across relay coil 90 will be equal to the battery potential $-2V_{ce(sat)}$ where $V_{ce(sat)}$ is the collector-to-emitter saturation voltage of transistors 11 and 12. Before capacitor 35 becomes charged and transistor 12 comes out of saturation, the relay contacts will have been switched so that relay arm 93 will be in contact with contact 96. After a time, determined by resistor 34 and capacitor 35 transistor 12 will come out of saturation and the circuit will revert to the original cutoff mode. The contacts can be switched back to the original position by repeating the operation just described.

Figure 5:
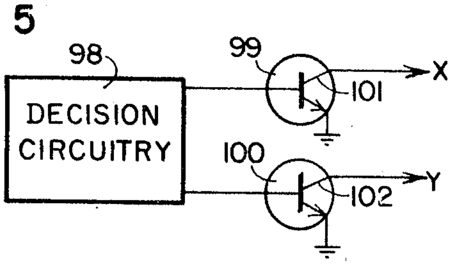
FIG. 5 is a partial block diagram and partial schematic showing the use of the circuit of FIG. 4 in a different manner.

Referring to FIG. 5 there is shown a circuit in which the use of a relay contact is avoided and in which the circuit can be switched to the desired state instead of toggling. In the circuit of FIG. 5 the decision circuitry determines which of transistors 99 or 100 will be biased to conduction. The transistors 99 and 100 take the place of relay 90 and contacts 93, 95 and 96 of FIG. 4. The collector 91 of transistor 99 is connected to point X (contact 95 of FIG. 4), and the collector 102 of transistor 100 is connected to point Y (contact 96 of FIG. 4). With transistor 99 biased to conduction the action of the circuit of FIG. 5 will be the same as if relay arm 93 was in contact with relay contact 95 and switch 94 was closed. If transistor 100 is biased to conduction the result would be the same as if relay arm 93 was in contact with relay contact 96 and switch 94 was closed.

I claim:

1. A high efficiency multivibrator circuit including in combination, first, second, third and fourth bridge terminals, first and second transistors of a first polarity type and third and fourth transistors of a second polarity type opposite to said first polarity type, said first and second transistors each having emitter electrodes connected to said first bridge terminal, collector electrodes connected to said fourth and second bridge terminals respectively and base electrodes, said third and fourth transistors each having collector electrodes connected to said second and fourth bridge terminals respectively, emitter electrodes connected to said third bridge terminal and base electrodes, power supply means having a first supply terminal coupled to said first bridge terminal and a second supply terminal coupled to said third bridge terminal, load means connected between said second and fourth bridge terminals, first control circuit means coupled to said base electrodes of said first and fourth transistors and to said second bridge terminal, said first control circuit including first resistance means connected to said base electrode of said fourth transistor, second control circuit means coupled to said base electrodes of said second and third transistors and to said fourth bridge terminal, said second control circuit including second resistance means connected to said base electrode of said third transistor, and switch means selectively connecting said first and second resistance means to said first supply terminal to control the conductivity of said transistor to thereby control energization of said load means from said power supply means.

2. A high efficiency multivibrator circuit, including in combination, first, second, third and fourth bridge terminals, first and second transistors of a first polarity type and third and fourth transistors of a second polarity type opposite to said first polarity type, said first and second transistors each having emitter electrodes connected to said first bridge terminal, collector electrodes connected to said fourth and second bridge terminals respectively and base electrodes, said third and fourth transistors each having collector electrodes connected to said second and fourth bridge terminals respectively, emitter electrodes connected to said third bridge terminal and base electrodes, power supply means having a first supply terminal coupled to said first bridge terminal and a second supply terminal coupled to said third bridge terminal, load means connected between said second and fourth bridge terminals have a center tap thereon, first control circuit means coupled to said base electrodes of said first and fourth transistors and to said second bridge terminal, said first control circuit means including first resistance means coupling said center tap of said load means to said base electrode of said fourth transistor, and second control circuit means coupled to said base electrodes of said second and third transistors and to said fourth bridge terminal, said second control circuit means including second resistance means coupling said center tap of said load means to said base electrode of said third transistor.

3. The multivibrator circuit of claim 2 wherein said load means includes third and fourth resistance means connected together at said center tap.

4. A high efficiency multivibrator circuit, including in combination, first, second, third and fourth bridge terminals, first and second transistors of a first polarity type and third and fourth transistors of a second polarity type opposite to said first polarity type, said first and second transistors each having emitter electrodes connected to said first bridge terminal, collector electrodes connected to said fourth and second bridge terminals respectively and base electrodes, said third and fourth transistors each having collector electrodes connected to said second and fourth bridge terminals respectively, emitter electrodes connected to said third bridge terminal and base electrodes, power supply means having a first supply terminal coupled to said first bridge terminal and a second supply terminal coupled to said third bridge terminal, load means connected between said second and fourth bridge terminals and having a high impedance to relatively high frequency alternating currents and a low impedance to relatively low frequency alternating currents, first control circuit means including first resistance means and first capacitance means connected in series between said base electrode of said first transistor and said base electrode of said fourth transistor, said first control circuit means including first constant current supply means coupled to said first supply terminal and to said base electrode of said fourth transistor, second control circuit means including second resistance means and second capacitance means connected in series between said base electrode of said second transistor and said base electrode of said third transistor, said second control circuit means including said constant current supply means coupled to said first supply terminal and to said base electrode of said third transistor, and input circuit means for receiving an input signal and differentially coupling the same to said first and second constant current supply means for regulating the current supplied to said first and second capacitance means.

5. A high efficiency multivibrator circuit, including in combination, first, second, third and fourth bridge terminals, first and second transistors of a first polarity type and third and fourth transistors of a second polarity type opposite to said first polarity type, said first and second transistors each having emitter electrodes connected to said first bridge terminal, collector electrodes connected to said fourth and second bridge terminals respectively and base electrodes, said third and fourth transistors each having collector electrodes connected to said second and fourth bridge terminals respectively, emitter electrodes connected to said third bridge terminal and base electrodes, power supply means having a first supply terminal coupled to said first bridge terminal and a second supply terminal coupled to said third bridge terminal, load means connected between said second and fourth bridge terminals, first control circuit means including first resistance means and first capacitance means connected in series between said base electrode of said first transistor and said base electrode of said fourth transistor, second control circuit means including second resistance means and second capacitance means connected in series between said base electrode of said second transistor and said base electrode of said third transistor, and switch means operable to a first position for coupling the junction between said first capacitance means and said first resistance means to said second supply terminal and to a second position for coupling the junction between said second capacitance means and said second resistance means to said second supply terminal.

6. The multivibrator circuit of claim 5 further including logic means coupled to said switch means for operating the same whereby one of said first and second positions of said switch means is momentarily activated.

7. The multivibrator circuit of claim 5 wherein said load means includes relay means, and said switch means is provided by the contacts of said relay means and is operated to said first position in response to current flow through said load means in one direction and is operated to said second position in response to current flow through said load means in the opposite direction.

8. The multivibrator circuit of claim 7 including further switch means connected in series from said second supply terminal to said first recited switch means.

9. The multivibrator circuit of claim 8 further including third resistance means coupled from said base electrode of said fourth transistor to said second supply terminal and fourth resistance means coupled from said base electrode of said third transistor to said second supply terminal.